United States Patent [19]

St-Michel

[11] Patent Number: 4,786,547
[45] Date of Patent: Nov. 22, 1988

[54] EXTERIOR INSULATING SHEATHING

[75] Inventor: André St-Michel, Lorraine, Canada

[73] Assignee: Domtar Inc., Montreal, Canada

[21] Appl. No.: 36,501

[22] Filed: Apr. 9, 1987

[51] Int. Cl.$^4$ ............... B32B 3/26; B32B 7/02/7/12
[52] U.S. Cl. .................................. 428/215; 428/311.7; 428/314.4; 428/314.8; 428/317.1; 428/490
[58] Field of Search ............... 428/308.4, 326, 484, 428/490, 318.4, 317.7, 215, 304.4, 311.7, 311.9, 314.4, 314.8, 317.1, 489, 490

[56] References Cited

U.S. PATENT DOCUMENTS

| | | | |
|---|---|---|---|
| 3,887,415 | 6/1975 | Elmendorf et al. | 428/326 X |
| 4,042,746 | 8/1977 | Hofer | 428/308.4 |
| 4,073,674 | 2/1978 | Hörtel | 428/318.4 X |
| 4,083,743 | 4/1978 | Degens | 428/326 X |
| 4,259,386 | 3/1981 | Wagstaffe | 428/326 X |
| 4,262,052 | 4/1981 | Kannan et al. | 428/308.4 |
| 4,479,912 | 10/1984 | Bullock | 428/326 X |
| 4,503,106 | 3/1985 | Cogliano | 428/318.4 X |
| 4,564,554 | 1/1986 | Mikuski | 428/318.4 X |
| 4,587,164 | 5/1986 | Freeman | 428/318.4 X |
| 4,651,494 | 3/1987 | Van Wagoner | 428/318.4 X |

Primary Examiner—William J. Van Balen
Attorney, Agent, or Firm—Antoine H. Gauvin

[57] ABSTRACT

An exterior insulating sheathing which comprises a foam polystyrene ply and a second ply glued to said polystyrene ply throughout. The second ply is preferably a fiberboard but may also be a waferboard. The sheathing is nailable, has a racking load of about 1900 to 3700 lbs, and has at least he exposed side of the second ply water resistant. This sheathing has a minimum tensile strength of 65±14 kPa, a linear expansion at 97% RH and 23° C., of less than 0.40%±0.02, a water vapor transmission of at least 96$^{ng}$.Pa.s.m$^2$, and a modulus of rupture of 0.5 to 17.2 megaPascal.

6 Claims, 1 Drawing Sheet

EXTERIOR INSULATING SHEATHING

This invention relates to an exterior insulating sheathing and more particularly to a composite product having improved structural strength, and other improved properties over the present existing insulating sheathings as will be discussed hereinafter.

BACKGROUND OF THE INVENTION

There are several kinds of exterior insulating sheathings existing: Polystyrene, polyurethane, polyisocyanurate, glass fiber, and phenolic sheathings are known and used. These are normally 4 feet wide by 8 feet long or 4×9, and occasionally 2 feet by 8 feet. However, these do not possess the rigidity one would wish them to have.

In house construction, generally walls are built on the floor: The beams are laid down and the sheathing fixed to them, after which the wall is lifted to an upright position: In Canada, walls that are constructed on the floor and then upraised, is termed platform construction. The insulating sheathings are normally 4 feet by 8 feet. In order to fix the insulating sheathing one has to walk on the 2"×6" or 2"×4" beams, or beams having other size, sometimes walking on the sheathing itself. Such walking on the sheathing often results in its perforation due to its weakness. Another problem associated with some sheathings is their tendency to warp, yielding a surface which is not flat, in particular the glass fiber one. In such cases, new sheathing must replace the old one. Because sheathings of glass fiber and foam have low strength, braces have also to be put; this is an additional expense and adds to costs. Also, there is no composite materials having exterior insulating sheathing that exist. The composite materials that are known, are generally spot glued.

THE INVENTION

Applicant is now providing a sheathing which overcomes part of, or all of the above mentioned drawbacks. Broadly stated, the invention is directed to an exterior insulating sheathing comprising a foam polystyrene ply and a second ply which is preferably a fiberboard ply or may also be a wafer -board, said second ply being glued to said polystyrene ply throughout with a continuous layer of glue, so that said continuous layer of glue is sandwiched between said foam polystyrene ply and said second ply has to continuously fasten said polystyrene ply to said second ply, to form a unitary product defining a sheathing, said sheathing having the exposed side of said second ply board water resistant, said sheathing being nailable and having a racking minimum load according to the ASTM E-72 of 1900 to 3700 lbs, a minimum tensile strength of 65±14 kPa, a linear expansion at 97% relative humidity (RH) and 23° C., of less than 0.40%±0.02, and a minimum water vapour transmission of 96 at least nonagram per second per meter square ($ng$/Pa.s.m$^2$) and a modulus of rupture of 0.5 to 17.2 megaPascal (mPa).

BRIEF DESCRIPTION OF THE DRAWINGS

Further features, objects and advantages will be evident following detailed description of the preferred embodiments of the present invention taken in conjunction with the accompanying drawings, in which.

DESCRIPTION OF THE PREFERRED EMBODIMENT

Figure 1:
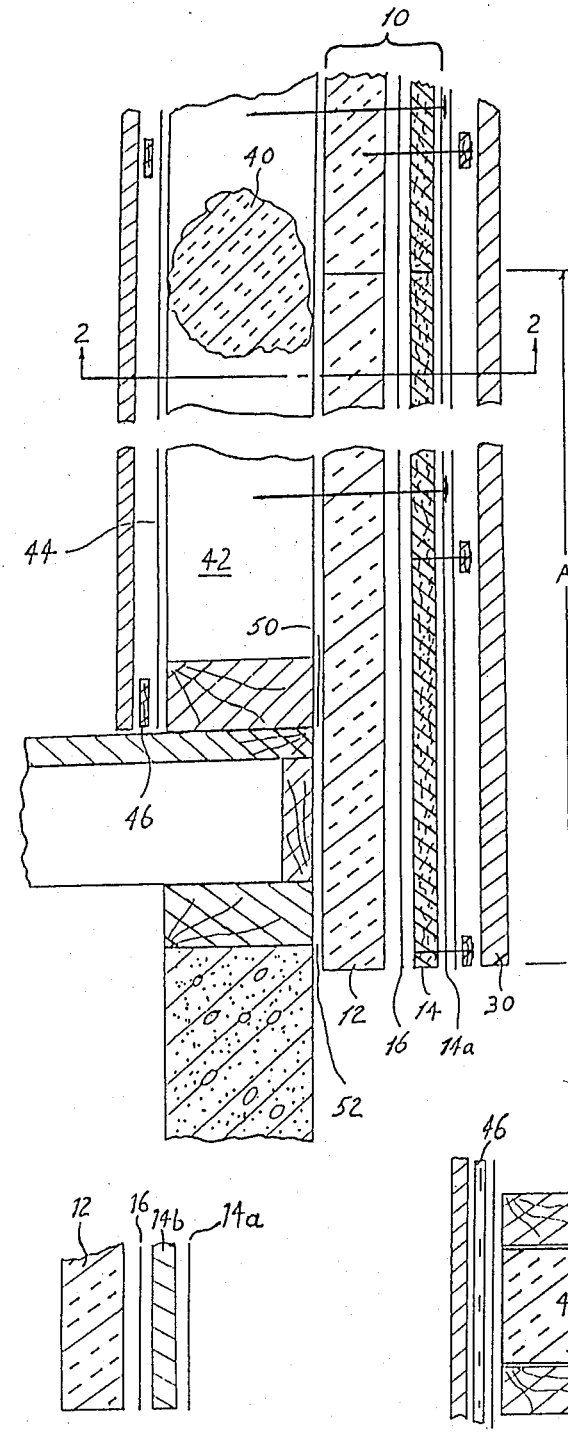
FIG. 1 is an exploded view illustrating one form of a sheathing as obtained in a particular embodiment of the present invention and position in a wall for better understanding.
Figures 2, 3:
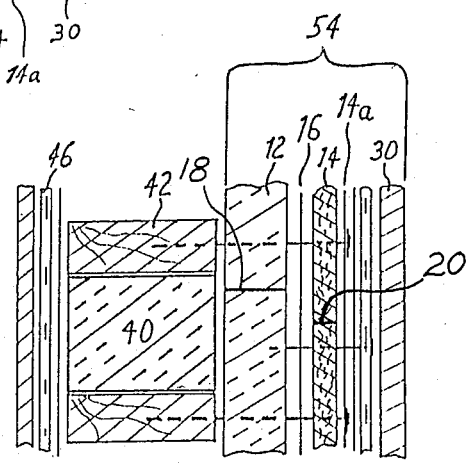
FIG. 2 is a top view along line 2—2 of FIG. 1.
FIG. 3 is a segmented view illustrating another embodiment of the invention.

As shown in FIGS. 1 and 2, the sheating 10, comprises a ply of polystyrene foam 12, and a ply of fibre board 14, glued throughout onto said polystyrene foam 12. Preferably, the polystyrene foam 12 is good quality of expanded and extruded polystyrene (such expanded polystyrene for instance is obtained by steam expansion of polystyrene marbles). For example, such a polystyrene may have a density of: 0.6 to 1.5 lb/ft$^3$, and has a thickness of normally 1.5 inch although it may vary within a thickness of 1.5±1 inch, with the foam density according to the intended use.

The fiberboard ply 14 is normally in the order of about half an inch or 7/16 of an inch, it is generally a fiberboard which is asphalt coated on one side, as shown at 14a, said coated side to be the exterior side of the sheathing 10. If desired, in order to obtain water resistance of the exposed side of the second ply of the sheathing, instead of a fiberboard which is asphalt coated, an asphalt impregnated fiberboard may be used.

The fiberboard ply 14 and the polystyrene foam ply 12 have a continuous layer of glue 16 sandwiched in between, to form a good unitary product. Although the layer 16 may be hot melt glue, it is preferable to use a glue such as vinyl acetate glue or other like glue compatible with the foam layer 12 and the fiberboard layer 14. The glue 16 has to be spread throughout the common surface adjacent the polystyrene foam ply 12 and the fiberboard ply 14. It is preferable to lay the fiberboard ply 14 in stagger relationship on the polystyrene ply 12 as to obtain a ship lap and thereby preventing a thermal bridge as shown at 18 and 20.

In accordance with my invention, it is also preferable to produce these sheathing 10 in size 2"×4'×9'. In making a wall, for instance, the exterior insulating sheathing 10 is nailed to the beams with polystyrene ply 12 facing the beams (such as 2"×6" or 2"×4") which are laid on a floor. During this operation, a person of normal weight can walk over the sheathing 10 without occurance of breaking the polystyrene ply 12: the fiberboard 14 enabling a greater weight distribution over the polystyrene layer 12. Also, generally it has been found that the present insulating sheathing 10 when affixed to the beams eliminates need for bracing, said sheathing 10 having sufficient structural strength to hold the beams. Yet sheathing 10 is very easily cuttable, and it was found to have excellent dimensional stability aside from having good insulating characteristics. Once fixed on the 2"×6" or 2"×4", the wall is put on its upward position, the exterior of the sheathing 10 which is the fiberboard ply 14 coated with asphalt 14a is able to receive on it a finish 30, for instance clad boards such as vinyl or aluminum type which may be nailed through the sheathing 10 onto the beams.

From the interior in succession are added, for instance, the glass fibre 40 in between the spacing created by the beams 42, a air/vapor barrier 44 held in place by strapping 46, and then the gypsum wall panel as shown in FIGS. 1 and 2 next to strapping 46.

Since the wall panels are generally 4'×8', the 4'×9' sheathing panels allow an overhand beyond the wall to cover the floor spacing 50-52. Also, as is easily seen the present invention allows for a gain 54 in the floor surface area over the prior art that requires the insulating sheathing 10 to rest on the floor instead in accordance with present invention said sheathing 10 is secured on beam 42. As seen in FIG. 3, the polystyrene foam ply 12 is fastened by glue 16 to a waferboard 14b which is generally self-containing a wax coating as is illustrated by means of 14a.

Such a sheathing has generally a minimum tensile strength of about $65 \pm 14$ kPa, a linear expansion at 97% RH and 23° C. of less than $0.40\% \pm 0.02$, and a minumum water vapour transmission of 96 nonagrams per second per meter square ($^{ng}/Pa.S.m^2$) a modulus of rupture of 0.5 to 17.2 megaPascal (mPa). When fiberboard is used, the minimum racking load is of the order of $2100 \pm 200$ lbs and the modulus of rupture is of the order of $0.6 = 0.1$ megaPascal. When a wafer board is used, the minimum racking load is more of the order of $2300 \pm 300$ lbs for a ply having a thickness of $\frac{3}{8}''$ to $\frac{1}{4}''$ and $3500 \pm 200$ for a ply of 0.5 inch in thickness and the modulus of rupture is $16.2 \pm 1$ megaPascal.

The following will serve only to illustrate particular embodiments of the invention and to compare some of these embodiments over the prior art.

EXAMPLE 1

An insulating sheathing was made using a 0.5 inch fiberboard asphalt coated on one side, glued to a polystyrene foam having a density of 1 lb/ft$^3$ and a thickness of 1.5": the R value was determined and found to be 6.85. This was compared against the following existing insulating sheathing where R is shown:

| | |
|---|---|
| Applicant's product - 1.5" | 6.7 |
| Esclad TM Phenolic foam - 1.1" | 6.0 |
| Glasclad TM glass fibre 1" | 4.4 |
| Glasclad TM glass fibre 1½" | 6.7 |

EXAMPLE 2

Six insulating sheathing panels were made as in Example 1. The sheathing panels were a composite board of fiberboard 7/16" thick and expanded polystyrene 1-7/16" thick, measuring nominally 4'×9'. A racking load evaluation of the six (6) sheathing panels was made.

Three standard wood frames were built in accordance to ASTM Standard E-72, Section 14, each frame accomodating 2 sheathing panels. Stud grade spruce wood was used instead of the southern pine or douglas fir required by the Standard.

Sheathing panels were fastened with 3" spiral wood nails having a square plastic "washer" measuring 1×1". The nails were located at 6" intervals along the perimeter of the frame assembly and at 4 of the intermediate studs. Inside corner studs were not used to fasten the panels. The mix-stud where the sheathing panels buttjoint with approximately ½" fiberboard overlap on the polystyrene, nails were placed on both sheathing panels at varying angles between 15 to 30 degrees from the vertical at 6" intervals.

A hydraulic jack with a nominal capacity of 10,000 lb was used to apply the load. A Moog Servo Controller and load cell feedback system controlled the applied load which was read in a Daytronic Model 9005 Strain Gage Transducer Conditioner/Indicator with a resolution of 5 lb.

Racking loads were applied at intervals varying between 50 and 250 lbs. Readings were taken immediately after reaching each load level. Dial Gages #1 and #2 were removed when damage was possible. The test results are shown in Tables 1, 2 and 3.

TABLE 1

Frame No: 1

| Dial Gage Reading Inches | | | |
|---|---|---|---|
| #1 | #2 | #3 | Load, lbs. |
| 0 | 0 | 0 | 0 |
| .115 | 0 | .20 | 50 |
| .310 | .002 | .67 | 100 |
| .420 | .047 | 1.10 | 150 |
| | | 1.53 | 400 |
| | | 1.77 | 500 |
| | | 2.05 | 600 |
| | | 2.16 | 700 |
| | | 2.68 | 850 |
| | | 3.07 | 1000 |
| | | 3.50 | 1200 |
| | | 5.27 | 1800 |
| (Maximum racking load recorded) | | | 2220 |

TABLE 2

Frame No: 2

| Dial Gage Reading Inches | | | |
|---|---|---|---|
| #1 | #2 | #3 | Load, Lbs |
| 0 | 0 | 0 | 0 |
| .468 | .028 | .67 | 260 |
| .476 | .038 | 1.10 | 500 |
| .632 | .051 | 2.36 | 860 |
| .688 | .058 | 3.03 | 1000 |
| | | 4.57 | 1500 |
| | | 6.14 | 1800 |
| | | 7.12 | 1940 |
| (Maximum racking load) | | | 2100 |

TABLE 3

Frame No: 3

| Dial Gage Reading Inches | | | |
|---|---|---|---|
| #1 | #2 | #3 | Load, Lbs |
| 0 | 0 | 0 | 0 |
| .130 | .015 | .27 | 100 |
| .235 | .058 | .55 | 200 |
| .360 | .228 | 1.26 | 400 |
| .408 | .243 | 1.61 | 500 |
| .445 | .253 | 2.00 | 600 |
| .492 | .263 | 2.44 | 700 |
| .525 | .268 | 2.71 | 800 |
| .555 | .273 | 3.11 | 900 |
| .585 | .277 | 3.38 | 1000 |
| .610 | .279 | 3.70 | 1100 |
| .631 | .281 | 3.97 | 1200 |
| .660 | .284 | 4.33 | 1300 |
| | | 5.00 | 1550 |
| | | 5.31 | 1600 |
| | | 5.75 | 1700 |
| | | 6.22 | 1800 |
| (Maximum racking load) | | | 2000 |

EXAMPLE 3

1. INTRODUCTION

A sample sheathing panel was made as in Example 1. The panel had a first ~ 12 mm ($\frac{1}{2}''$) bitumen coated fibre board ply and a ~37 mm ($1\frac{1}{2}''$) expanded polystyrene insulation board, and nominal dimensions of $1220 \times 2743 \times$ mm ($48'' \times 108'' \times 2''$). The following tests were made:
(1) Weight per unit area
(2) Tensile strength (ASTM D1623)—perpendicular (3) Racking load (ASTM) E73 Sect. 14)
(4) Linear expansion (ASTM D1037)
(5) Water vapour transmission (ASTM E96)
(6) Water absorption (ASTM D2842) —after 2 and 24 hrs under 50 mm of $H_2O$
(7) Flexural strength (ASTM C203)—at 250, 406 and 610 mm spans The results are shown in Tables 4, 5 and 6.

TABLE 4

| Specimen | (1) Weight (kg/m²) | (2)* Tensile Strength (kPa) | (3) Racking Load (lbs)max | (4) Linear Expansion(%) 97% RH, 23° C. |
|---|---|---|---|---|
| 1 | 3.77 | 75.1 | 2,220 | 0.39 |
| 2 | 3.81 | 45.0 | 2,100 | 0.39 |
| 3 | 3.80 | 65.8 | 2,000 | 0.41 |
| 4 | 3.80 | 74.2 | | 0.42 |
| 5 | | | | 0.41 |
| 6 | | | | 0.38 |
| Average | 3.80 | 65.0 | 2,107 | 0.40 |
| SD (n − 1) | 0.02 | 14.0 | 110 | 0.02 |

(2)* Cohesive failure of the fiberboard

TABLE 5

| Specimen | Water vapour transmission (g/s · m²) | (ng/Pa.s · m²) | Water absorption % after (2 hrs) | (24 hrs) |
|---|---|---|---|---|
| 1 | 1.33 × 10⁻⁴ | 96.0 | 1.45 | 9.42 |
| 2 | 1.47 × 10⁻⁴ | 106.0 | 1.46 | 7.51 |
| 3 | 1.39 × 10⁻⁴ | 100.6 | 1.38 | 7.46 |
| 4 | | | 1.42 | 8.12 |
| Average | 1.40 × 10⁻⁴ | 100.9 | 1.43 | 8.13 |
| SD (n − 1) | 7.0 × 10⁻⁶ | 5.0 | 0.04 | 0.91 |

TABLE 6

| | Flexural Strength* | | | | | |
|---|---|---|---|---|---|---|
| | Modulus of Elasticity (MPA) | | | Modulus of Rupture (kPa) | | |
| Specimen | 250 | 406 | 610 | 250 | 406 | 610 |
| 1 | 17.8 | 26.7 | 28.1 | 584 | 542 | 572 |
| 2 | 16.8 | 27.8 | 29.8 | 613 | 601 | 567 |
| 3 | 17.0 | 27.6 | 29.6 | 591 | 535 | 587 |
| 4 | 17.6 | 24.5 | 29.4 | 610 | 543 | 529 |
| 5 | 18.1 | 27.4 | 30.3 | 562 | 594 | 598 |
| Average | 17.5 | 26.8 | 29.4 | 592 | 563 | 571 |
| SD (n − 1) | 0.5 | 1.4 | 0.8 | 21 | 32 | 26 |

*With expanded polystyrene in tension

EXAMPLES 4 to 6

Four pieces of polystyrene foam composite boards with each board measuring approximately 1200×1200×48 mm (48"×48"×1-7/8") were made with 38 mm thick polystyrene foam and bonded with 10 mm thick compressed wood fiberboard. These insulation products were analyzed for thermal conductivity and thermal resistance determination as follows:

(1) Equipment

The Dynatech R-Matic heat-flow meter having a test accuracy of about ±2% was used to perform all tests. This instrument has the established capability of measuring test sample with thickness up to 200 mm and it conforms to ASTM C-518, Standard Test Method for Steady-State Transmission Properties by Means of the Heat-Flow Meter.

(2) Sample Preparation

Three boards were randomly selected for sample preparation. (Examples 4 to 6). A test specimen measuring 610×610 mm (24"×24") was prepared from the central portion of each board. The thickness of the test specimens was measured accurately with a dial gauge in 12 points and an average thickness value was determined. The total mass of each specimen was weighed to an accuracy of ±0.01 kg. The mass and thickness of the test specimens are given in Table 7.

The prepared test specimens were conditioned at 25° C. and 50% R.H. humidity for 48 hours prior to the test.

(3) Test Procedure

Each of the test specimen was first placed in the test chamber of the instrument and the chamber plate separation was set at the exact thickness of the sample. The instrument was then activated and equilibrated until a steady-state condition was reached. For each test, the test specimen has been kept in the instrument for a period totalling about 4.5 hours to monitor the steady-state equilibrium condition by a computer controlled data acquisition system. The test was conducted at atmospheric pressure and ambient room conditions, with room temperature in the range of 22°–24° C. and humidity in the range of 45–50% R.H. The mean temperature of each test sample was about 24.5°±0.1° C. and the temperature differential across the test specimen was about 22.1°±0.1° C.

RESULTS

The thermal conductivity, K-factor, and thermal resistance, R-value, of the test samples have been determined and are given in the following Table 7, in both metric SI units and imperial units.

TABLE 7

Thickness, Foam Mass and Foam Density of Test Samples

| Example | Test Specimen Average Thickness (mm) | (inch) | Foam Mass (kg) | (lbs) | Foam Density (Kg/m³) | (lbs/ft³) |
|---|---|---|---|---|---|---|
| #4 | 48.60 | 1.91 | 1.41 | 3.10 | 77.79 | 4.08 |
| #5 | 48.58 | 1.91 | 1.44 | 3.17 | 79.35 | 4.96 |
| #6 | 48.58 | 1.91 | 1.39 | 3.06 | 76.40 | 4.79 |
| Average | 48.59 | 1.91 | 1.41 | 3.11 | 77.94 | 4.61 |

| | Thermal Conductivity, and K-Factor | | Thermal Resistance R/unit thickness | |
|---|---|---|---|---|
| Example | Metric SI Unit (W/m °C.) | Imperial Unit (Btu/ft² hr, °F./in) | Metric SI Unit (m² °C./M) /m | Imperial Unit (ft², hr °F./Btu)/in |
| #4 | 0.0425 | 0.2947 | 23.529 | 3.393 |
| #5 | 0.0428 | 0.2970 | 23.364 | 3.367 |
| #6 | 0.0414 | 0.2874 | 24.154 | 3.479 |
| Average | 0.0422 | 0.2930 | 23.682 | 3.413 |

Thermal Resistance, R-Value, per Test Sample Thickness

| Example | Metric SI Unit (m² °C./W) | Imperial Unit (ft², h, °F./Btu) |
|---|---|---|
| #4 | 1.143 | 6.493 |
| #5 | 1.134 | 6.438 |
| #6 | 1.172 | 6.656 |
| Average | 1.149 | 6.529 |

Modifications may be made without departing from the spirit of the invention as defined in the appended claims.

I claim:

1. An exterior insulating sheathing having a good vapour transmission consisting of a foam polystyrene ply and a second ply of fiberboard, said second ply having at least one side water resistant, said second ply being glued to said polystyrene ply throughout with a continuous layer of glue, so that said continuous layer of glue is sandwiched between said foam polystyrene ply and said second ply, as to continuously fasten said polystyrene ply to said second ply, to form a unitary product defining an exterior insulating sheathing, said exterior insulating sheathing having said at least one water resistant side of said second ply forming one of the exposed side of said exterior insulating sheathing, said exterior insulating sheathing being nailable and mountable on supporting beams and having a racking load according to ASTM E-72 of about 2100±200 lbs, a minimum tensile strength of 65±14 kiloPascal, a linear expansion at 97% relative humidity and 23° C., of less than 0.40%±0.02, a water vapour transmission of at least 96 nonagram per second per meter square ($ng/Pa.s.m^2$), and a modulus of rupture of 0.6±0.1 megaPascal (mPa).

2. The sheathing as defined in claim 1 wherein said polystyrene ply has a density of about 0.6 lbs/cu ft to 1.4 lbs.ft$^3$ and wherein the thickness of said polystyrene is 1.5±0.5 inch, and the thickness of said fiberboard ply is about 7/16 to 8/16 inch to form a unitary sheathing of about 2 inches in thickness.

3. The sheathing as defined in claim 2 wherein said fiberboard ply is about half an inch, said polystyrene ply about an inch and a half, and has a density value of 1±1 lb/ft$^3$, and the sheathing has a R value of 6.5±0.3 Imperial unit (ft$^2$, hr, oF/Btu) as per ASTM C518.

4. The sheathing as defined in claim 1 wherein the exposed said at least one water resistant side of said second ply is asphalt coated.

5. The sheathing as defined in claim 1 wherein the second ply is an asphalt impregnated fiberboard ply.

6. The sheating as defined in claim 1 having at least one ship lap.

* * * * *